tps://patents.google.com/patent/US9535724B2/en

(12) United States Patent
Shitaya et al.

(10) Patent No.: US 9,535,724 B2
(45) Date of Patent: Jan. 3, 2017

(54) INFORMATION PROCESSOR FOR WORK MACHINE, WORK MACHINE, AND INFORMATION PROCESSING METHOD FOR WORK MACHINE

(71) Applicant: KOMATSU LTD., Minato-ku, Tokyo (JP)

(72) Inventors: Yoshiyuki Shitaya, Hiratsuka (JP); Koichi Shima, Hiratsuka (JP); Shinsuke Yoneda, Hiratsuka (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 309 days.

(21) Appl. No.: 14/375,082

(22) PCT Filed: Apr. 16, 2014

(86) PCT No.: PCT/JP2014/060839
§ 371 (c)(1),
(2) Date: Jul. 28, 2014

(87) PCT Pub. No.: WO2015/159391
PCT Pub. Date: Oct. 22, 2015

(65) Prior Publication Data
US 2016/0299766 A1  Oct. 13, 2016

(51) Int. Cl.
*G06F 9/445*   (2006.01)
*G06F 9/44*    (2006.01)

(52) U.S. Cl.
CPC ............ *G06F 9/445* (2013.01); *G06F 9/441* (2013.01); *G06F 9/4406* (2013.01)

(58) Field of Classification Search
CPC .................. G06F 9/4401; G06F 9/445
See application file for complete search history.

(56) References Cited

U.S. PATENT DOCUMENTS 6,421,782 B1   7/2002   Yanagisawa et al.
7,111,160 B1   9/2006   Henniger et al.
(Continued)

FOREIGN PATENT DOCUMENTS

CN   1670698   9/2005
CN   1677317   10/2005
(Continued)

OTHER PUBLICATIONS

Office Action issued Dec. 9, 2014 for corresponding German Patent Application No. 112014000030.2, 20 pages.
(Continued)

*Primary Examiner* — Dennis M Butler
(74) *Attorney, Agent, or Firm* — Fish & Richardson P.C.

(57) ABSTRACT

A controller for a work machine includes a main board and a PC board. The main board includes a main controller that runs on a built-in work machine operating system, a first activator that activates the main controller when an activation signal for activating the controller is inputted, and an activation commander that outputs an activation-command signal to the PC board when the main controller becomes active. The PC board includes a PC controller that runs on an operating system for PCs, a network terminal, a network controller that outputs the activation signal to the main board when a specific signal for commanding activation is inputted, and a second activator that activates the PC controller when the activation-command signal outputted from the activation commander of the main board is inputted.

9 Claims, 5 Drawing Sheets

(56) References Cited

U.S. PATENT DOCUMENTS

| | | |
|---|---|---|
| 2005/0223332 A1 | 10/2005 | Ito |
| 2006/0097864 A1 | 5/2006 | Lammers et al. |
| 2006/0117172 A1 | 6/2006 | Zhang et al. |
| 2008/0229091 A1 | 9/2008 | Abu-Akel |
| 2008/0316522 A1 | 12/2008 | Yokoyama et al. |
| 2011/0167251 A1* | 7/2011 | Musha .................. G06F 9/4401 713/2 |
| 2012/0081212 A1 | 4/2012 | Ishihara et al. |
| 2015/0170441 A1* | 6/2015 | Kimura .................. G05B 19/05 701/33.4 |
| 2015/0254911 A1* | 9/2015 | Kimura .................... G06F 1/18 701/50 |

FOREIGN PATENT DOCUMENTS

| | | |
|---|---|---|
| CN | 201781588 | 3/2011 |
| CN | 102447564 | 5/2012 |
| JP | H11-85326 A | 3/1999 |
| JP | 2009-5019 A | 1/2009 |
| JP | 2010198158 A | 9/2010 |
| JP | 2012-076518 | 4/2012 |

OTHER PUBLICATIONS

International Search Report dated Jul. 1, 2014 from International Application No. PCT/JP2014/060839, 7 pages.
Office Action in corresponding Chinese Application No. 201480000674X, dated Jun. 30, 2016, 7 pages, with English translation.

* cited by examiner

INFORMATION PROCESSOR FOR WORK MACHINE, WORK MACHINE, AND INFORMATION PROCESSING METHOD FOR WORK MACHINE

CROSS-REFERENCE TO RELATED APPLICATIONS

This application claims priority to International Application No. PCT/JP2014/060839, filed on Apr. 16, 2014, the contents of which application are incorporated herein by reference in its entirety.

TECHNICAL FIELD

The present invention relates to an information processor for a work machine such as a hydraulic excavator, a work machine, and an information processing method for a work machine.

BACKGROUND ART

These days, work machines such as a hydraulic excavator and a dump truck have increasingly been electronized and/or have used information processing techniques. For instance, there has been known a remote diagnostic technique according to which a server receives operation data on a work machine sent from an operating-condition controller provided to the work machine via a radio communication network for the purpose of remote diagnosis of the work machine (see, for instance, Patent Literature 1).

CITATION LIST

Patent Literature(s)

Patent Literature 1: JP-A-2010-198158

SUMMARY OF THE INVENTION

Problem(s) to be Solved by the Invention

However, the operating-condition controller disclosed in Patent Literature 1, which sends operation data during the operation of the work machine, cannot send the operation data to the server, for instance, when the work machine is operated at a site where communication infrastructure has not been sufficiently developed.

For instance, when the work machine is operated in a mine, operation data can be acquired through a wireless LAN (Local Area Network) as long as the wireless LAN is usable at a predetermined place such as a gas station. Accordingly, the operation data on the work machine is stored in a memory provided to the work machine so that the operation data can be read from the memory when the work machine is moved to a place where a wireless LAN is usable.

However, when the work machine is not in operation, an engine is usually stopped and thus the operation of a work-machine controller (information processor) is also stopped due to the interruption of electric power supplied to the controller, so that the data cannot be externally read from the memory through a wireless LAN.

In this case, the work-machine controller, which is not in operation, can be remotely restarted through a wireless LAN as long as the work-machine controller includes a PC board that runs on an OS (Operating System) for PCs (Personal Computers), such as Windows (trademark). Specifically, a PC board usable in a general PC may have a WOL (Wake-on-LAN) function, by which the PC board becomes active upon the reception of a specific signal (so-called "magic packet") when the PC is turned on. When such a PC board is used as the work-machine controller, the controller can be remotely restarted through a wireless LAN and the operation data can be read from the memory even when the work machine is not in operation.

The OS for PCs is a high-spec OS capable of providing a variety of functions and also easily updating a program to expand a function.

However, a defect (bug) in the updated program may destabilize the activation operation of the PC board, so that the PC board cannot sometimes be properly activated. Therefore, when the PC board activates itself upon acknowledging the reception of the above specific signal, the PC board cannot sometimes be properly activated due to an unstable operation of the PC board.

An object of the invention is to provide an information processer for a work machine, a work machine, and an information processing method for a work machine that are capable of reliable activation.

Means for Solving the Problem(s)

According to an aspect of the invention, an information processor for a work machine includes: a first board; and a second board, the first board including: a main controller being configured to run on a built-in work machine operating system; a first activator being configured to activate the main controller when an activation signal for activating the information processor is inputted; and an activation commander being configured to output an activation-command signal to the second board, the second board including: a PC controller being configured to run on an operating system for personal computers; a communication unit being configured to communicate with an outside of the work machine; an external-activation-signal sender being configured to output the activation signal to the first board when a specific signal for commanding activation of the information processor is inputted to the communication unit from an outside of the work machine; and a second activator being configured to activate the PC controller when the activation-command signal outputted from the activation commander is inputted.

In the above aspect, it is preferable that the information processor for the work machine further include an activation-signal sender being configured to output the activation signal to the first board, the activation-signal sender being provided to the work machine, in which the activation-signal sender comprises the external-activation-signal sender and an internal-activation-signal sender that is configured to output the activation signal in response to occurrence of an event different from an event for the external-activation-signal sender, the first board further include an inputted-trigger processor being configured to output trigger information to the second board, the trigger information indicating a type of a trigger corresponding to the activation signal outputted from the activation-signal sender, and the second board further include a trigger-identifying processor being configured to identify the trigger based on the trigger information outputted from the inputted-trigger processor and to start an application corresponding to the identified trigger.

In the above aspect, it is preferable that the trigger-identifying processor include: a first determiner being configured to determine whether or not the trigger is associated with a maintenance activation and to activate a maintenance manager to perform an maintenance of the PC controller when the trigger is determined to be associated with the maintenance activation; and a second determiner being configured to be activated, when the first determiner determines that the trigger is not associated with the maintenance activation, to start an application corresponding to the type of the trigger determined to be different.

In the above aspect, it is preferable that the first board further include a monitor being configured to monitor whether or not the PC controller is in a normal operation.

In the above aspect, it is preferable that the first board further include a memory, and the main controller temporarily stores in the memory operation data on the work machine inputted to the first board when the PC controller is being activated and transfers the operation data temporarily stored in the memory to the second board after the PC controller becomes active.

According to another aspect of the invention, an information processor for a work machine includes: a first board including a main controller being configured to run on a built-in work machine operating system; a second board including a PC controller being configured to run on an operating system for personal computers; and an activation-signal sender being configured to output the activation signal to the first board, the activation-signal sender being provided to the work machine, the first board further including: a first activator being configured to activate the main controller when an activation signal for activating the information processor is inputted; an activation commander being configured to output an activation-command signal to the second board; an inputted-trigger processor being configured to output trigger information to the second board, the trigger information indicating a type of a trigger corresponding to the activation signal outputted from the activation-signal sender; and a monitor being configured to monitor whether or not the PC controller is in a normal operation, the second board further including: a communication unit being configured to communicate with an outside of the work machine; an external-activation-signal sender being configured to output the activation signal to the first board when a specific signal for commanding activation of the information processor is inputted to the communication unit from an outside of the work machine; a second activator being configured to activate the PC controller when the activation-command signal outputted from the activation commander is inputted; and a trigger-identifying processor being configured to identify the trigger based on the trigger information outputted from the inputted-trigger processor and to start an application corresponding to the identified trigger, in which the activation-signal sender comprises the external-activation-signal sender and an internal-activation-signal sender that is configured to output the activation signal in response to occurrence of an event different from an event for the external-activation-signal sender.

According to still another aspect of the invention, a work machine includes the information processor for the work machine.

According to yet another aspect of the invention, an information processing method for a work machine, the work machine including an information processor, the information processor including: a first board including a main controller being configured to run on a built-in work machine operating system; and a second board including: a PC controller being configured to run on an operating system for personal computers; a communication unit being configured to communicate with an outside of the work machine; and an external-activation-signal sender being configured to output an activation signal to the first board when a specific signal for commanding activation of the information processor is inputted to the communication unit from an outside of the work machine, the method includes: inputting the specific signal for commanding the activation of the information processor to the communication unit; outputting the activation signal to the first board from the external-activation-signal sender in response to the specific signal; activating the main controller in response to the activation signal; outputting an activation-command signal to the second board from the main controller; and activating the PC controller when the activation-command signal is inputted.

BRIEF DESCRIPTION OF DRAWING(S)

DESCRIPTION OF EMBODIMENT(S)

Exemplary embodiment(s) of the invention will be described below with reference to the attached drawings. Large-sized dump trucks intended to work in mines include an articulated dump truck having a laterally bendable vehicle body with separate front and rear vehicle frames and a rigid dump truck having integral front and rear vehicle frames. Description will be made on an exemplary embodiment of the invention applied to a work machine such as a rigid dump truck.

Figure 1:
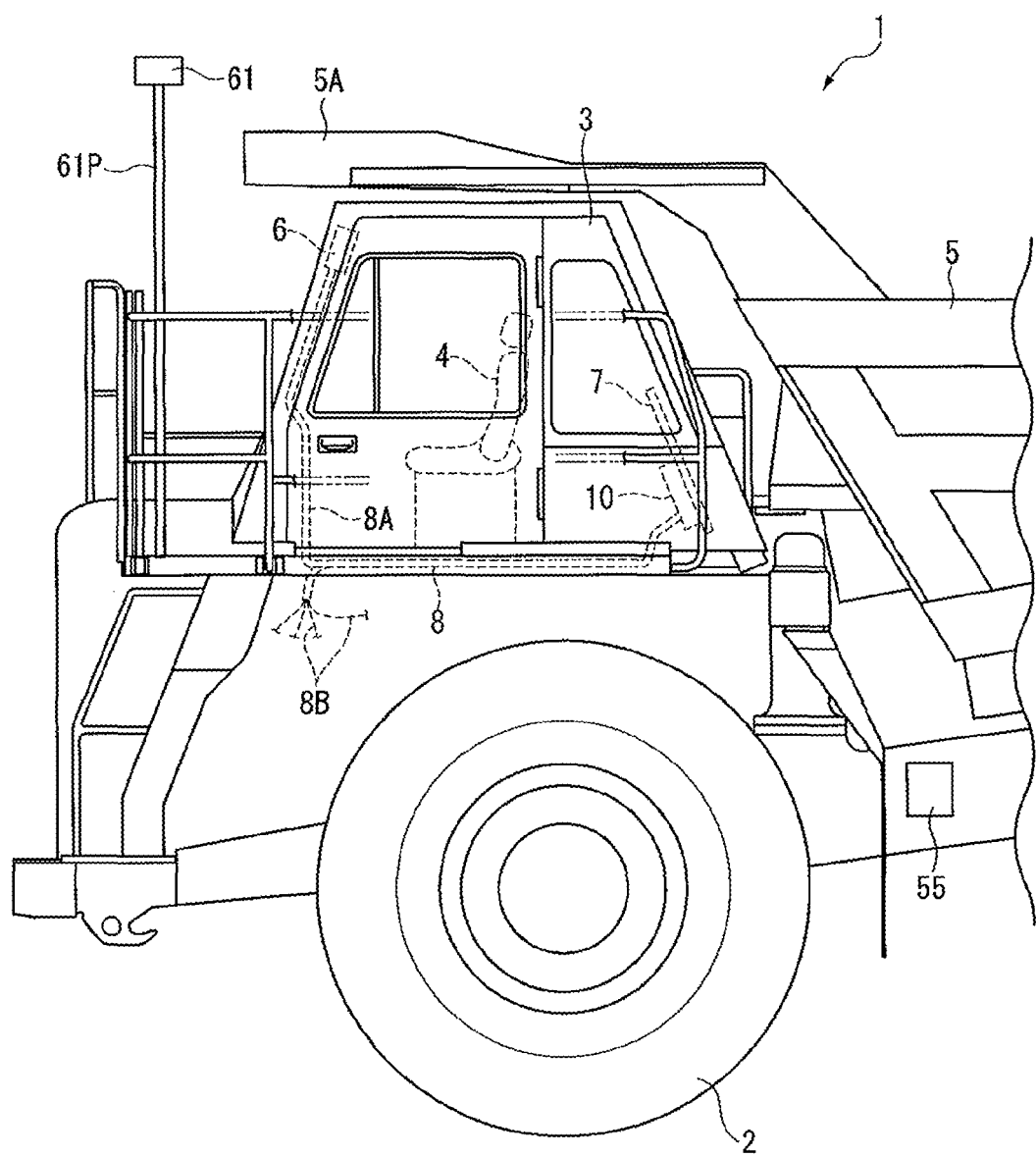
FIG. 1 is a side view showing a vehicle front portion of a dump truck as an example of a work machine.

FIG. 1 shows a vehicle front portion of a rigid dump truck 1 (a work machine) according to the exemplary embodiment. The rigid dump truck 1 is hereinafter simply referred to as the dump truck 1.

As shown in FIG. 1, the vehicle front portion of the dump truck 1 includes an operator's cab (hereinafter, "cab 3"), in which an operator is seated. The cab 3 is located above a front wheel 2. Specifically, the cab 3 is located near the forefront of the dump truck 1 at a left side relative to a right-left center of the dump truck 1. In the cab 3, there are provided an operator's seat 4 shown by dotted lines, a handle and a shift lever (not shown) for controlling the travel of the dump truck 1, a control lever (not shown) for tilting a vessel 5 that is a truck bed on which crushed stones or the like are put on, gauges and meters, and the like.

Additionally, as shown by dotted lines, a monitoring display 6 is also provided in the cab 3 at an upper front side. The monitoring display 6 may be provided anywhere in the cab 3 as long as an operator can reliably see the monitoring display 6. Additionally, a metal attachment board 7 is also provided in the cab 3 at a lower rear side and a controller 10 that serves as an information processor for a work machine is mounted on the attachment board 7.

The monitoring display 6 and the controller 10 are connected to each other through a monitor cable 8A. The controller 10 is also connected to a first end of an image-signal cable 8B. A second end of the image-signal cable 8B is connected to a plurality of monitoring cameras (not shown) mounted on the dump truck 1. The monitor cable 8A and the image-signal cable 8B are bundled into a wire harness 8 along with other signal cables. Incidentally, it is not requisite to mount a plurality of monitoring cameras.

Further, a pole 61P is set upright to be seen in front of the cab 3 on the left of an operator when the operator is seated on the operator's seat 4. An antenna 61 for a wireless LAN is attached on this pole. The antenna 61 may be attached anywhere but is preferably attached at a level higher than a level of a flange 5A of the vessel 5 to ensure a favorable transmission status.

A connector box 55 is provided behind the front wheel 2. A connector terminal and a DIN-activation switch 54 (described later) are housed in the connector box 55. Incidentally, a term "DIN" in the DIN-activation switch 54 is an acronym of "Digital Input" and a term "DIN-activation" means activation based on a general ON/OFF input.

Case of Controller

Figure 2:
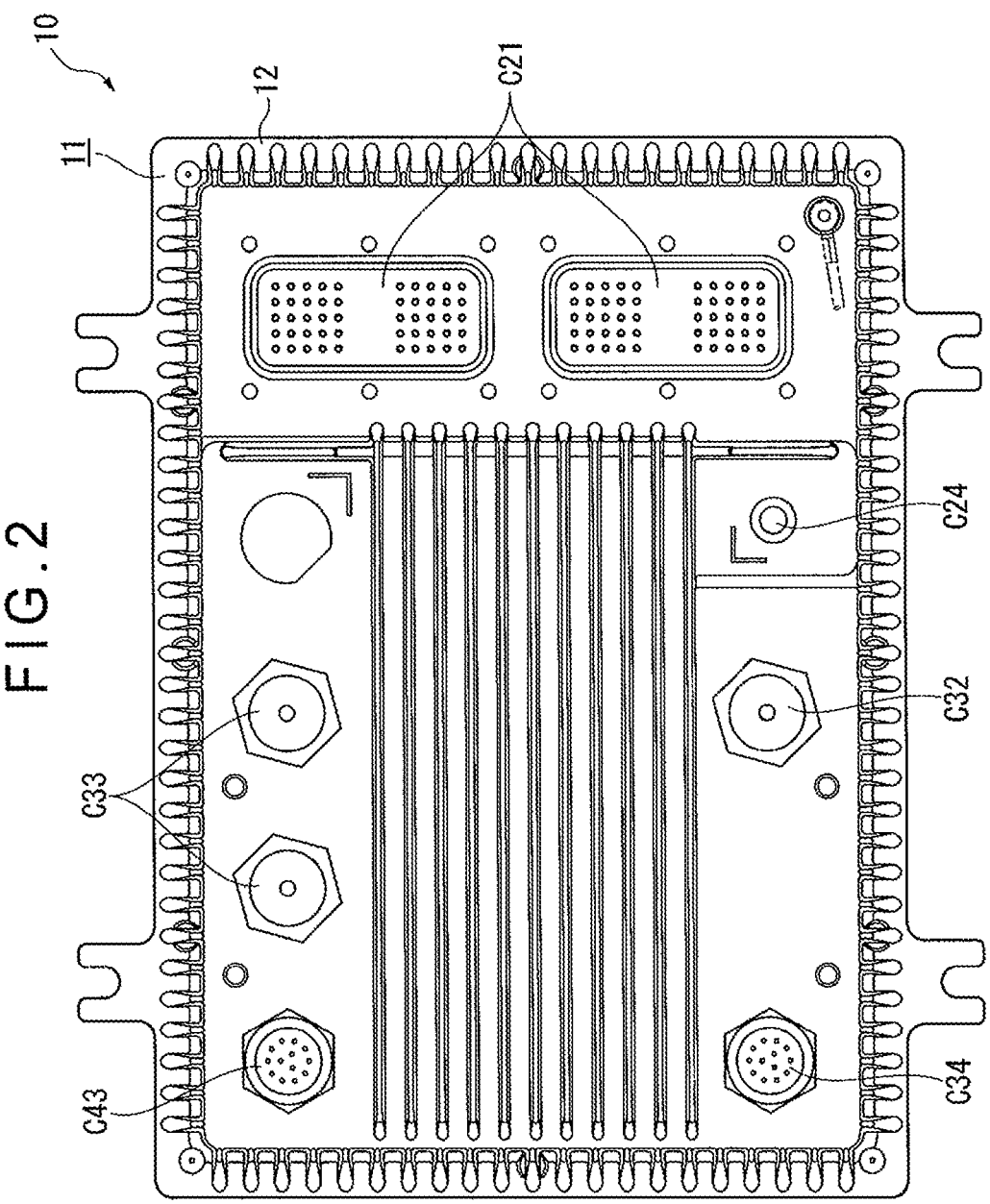
FIG. 2 is a plan view of a controller for the work machine.
Figure 3:
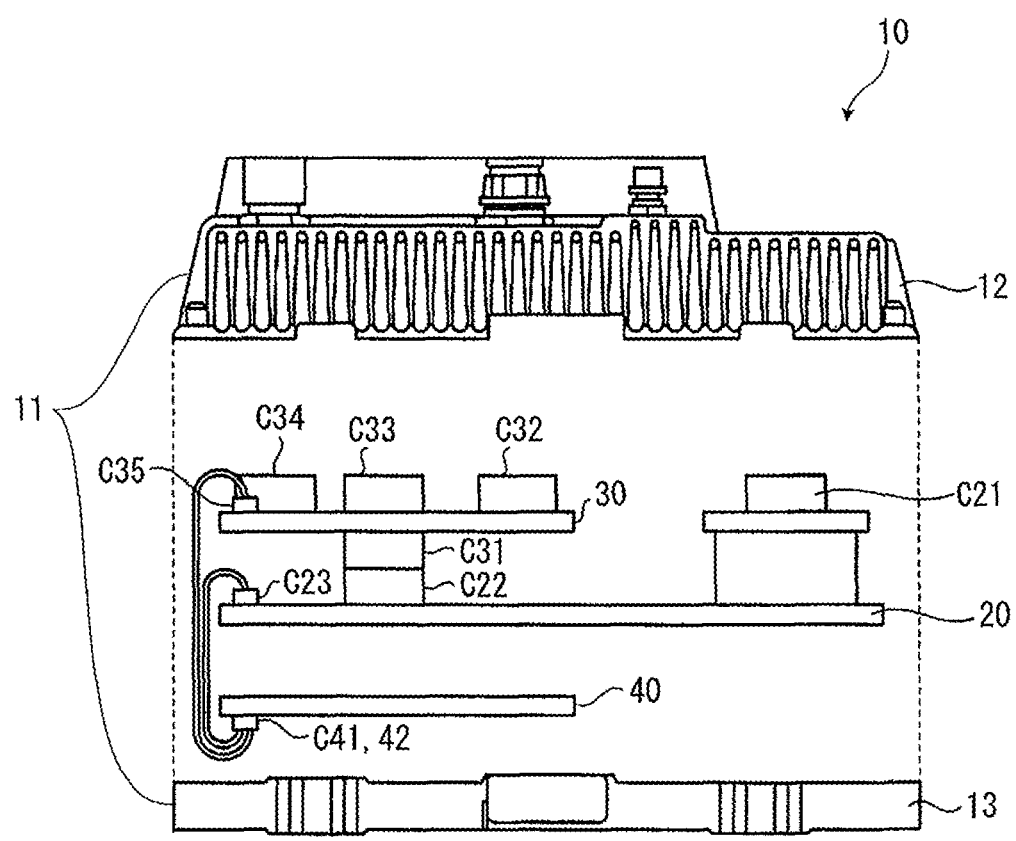
FIG. 3 is an exploded side view of the controller for the work machine.

FIG. 2 is a plan view of the controller 10 and FIG. 3 is an exploded side view of the controller 10. The controller 10 includes a case 11. The case 11 includes an upper case 12 and a lower case 13.

The case 11 houses a main board 20 (a first board), a PC (Personal Computer) board 30 (a second board), and an extension-function-processing board 40.

The upper case 12 and the lower case 13 are die-casted from a material with a favorable heat conductivity such as aluminum. The upper case 12 and the lower case 13 are provided with a plurality of heat-releasing fins so that heat generated by the main board 20 and the like housed therein is released outside to ensure a stable operation of the main board 20 and the like and to prevent damage to the main board 20 and the like.

Connectors of Main Board

The main board 20 includes a connector C21 for connection to the wire harness 8, a connector C22 for connection to the PC board 30, a connector C23 for connection to the extension-function-processing board 40, and a connector C24 for connection between a GPS antenna 70 (shown in FIG. 4) and a GPS sensor.

The connector C22 is configured to transmit and receive a signal for a general USB (Universal Serial Bus) and may be a connector configured for a general USB interface. With such a connector C22, even when the PC board 30, which is connected to the main board 20, is to be changed in design, the PC board 30 can be easily replaced with a new one with the changed design. Further, since the connector C22 is configured for a general USB interface, the main board 20 can be easily connected to an external PC or the like and thus the development of the main board 20 can be facilitated.

Connectors of PC Board

The PC board 30 includes a USB interface connector C31 for connection to the main board 20, a connector C32 for external connection to the outside of the controller 10, a network terminal C33 for connection to an Ethernet (trademark) LAN cable (coaxial cable), and a connector C34 for connection to the monitor cable 8A. The PC board 30 also includes a PCI (Peripheral Component Interconnect) express connector C35 for connection to the extension-function-processing board 40.

The PC board 30 includes the USB interface connector C31 and the network terminal C33 for connection to the LAN cable. As shown in FIG. 2, the network terminal C33 includes at least two terminals, at least one of which has a line through which electric power is outputted (i.e., POE (Power over Ethernet)). This electric power is used as electric power supplied to, for instance, a wireless LAN modem (not shown). The PC board 30 is connected to a PC or the like via the connector C31 to be easily accessed.

Further, the PC board 30 can be easily accessed from a PC or the like outside the work machine via the network terminal C33, so that an application program installed in the PC board 30 can be easily debugged and/or developed and data stored in the PC board 30 can be easily and rapidly transferred.

Connectors of Extension-Function-Processing Board

The extension-function-processing board 40 includes a connector C41 for connection to the main board 20, a PCI express connector C42 for connection to the PC board 30, and a connector C43 for connection to a camera set (not shown).

The PC board 30 and the extension-function-processing board 40 are connected to each other through a PCI express flat cable, which enables high-speed transfer of various types of information.

Arrangement of Boards in Case

When a side of the controller 10 including the upper case 12 is defined as the upper side of the controller 10 and a side of the controller 10 including the lower case 13 is defined as the lower side of the controller 10, the PC board 30 is located above the main board 20 and the extension-function-processing board 40 is located below the main board 20 in the case 11.

The connector C22 of the main board 20 and the connector C31 of the PC board 30 are directly connected to each other. The connector C21, which includes two connectors, and the connector C24 of the main board 20 are exposed on a surface of the upper case 12 as shown in FIG. 2, the connector C24 being connected to the GPS antenna 70.

The connector C32, the two network terminals C33 and the connector C34 of the PC board 30 are also exposed on the surface of the upper case 12 as shown in FIG. 2.

The connector C43 of the extension-function-processing board 40 for connection to the camera set (not shown) is also exposed on the surface of the upper case 12 as shown in FIG. 2.

Overall Arrangement of Control System

Figure 4:
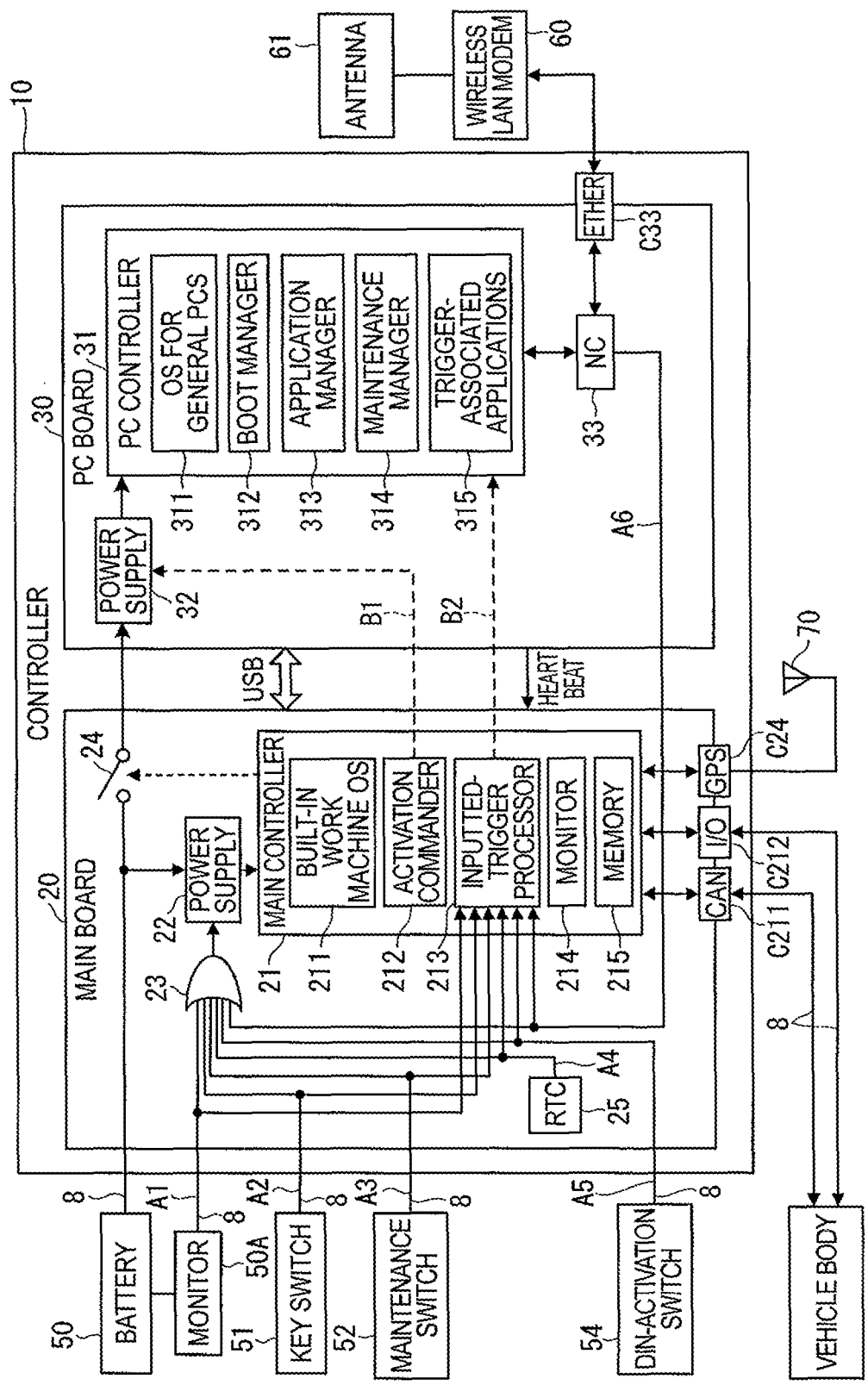
FIG. 4 is a block diagram showing a control system of the controller for the work machine.

FIG. 4 is a block diagram showing a control system of the controller 10 mounted on the dump truck 1 (i.e., an example of a work machine). As shown in FIG. 4, the controller 10 (i.e., the information processor for a work machine) is connected to a CAN (Controller Area Network) and a signal line that are provided to a vehicle body through the wire harness 8 connected to the connectors C21 of the main board 20. Similarly, a battery 50, a key switch 51, a maintenance switch 52 and the DIN-activation switch 54 that are provided to the work machine are connected to the main board 20 through the wire harness 8 connected to the connectors C21. The main board 20 includes a built-in real-time clock (RTC) 25 (i.e., a clock IC).

In other words, the wire harness 8 connected to the connectors C21 is a bundle of the CAN and a plurality of signal lines and power lines. Specifically, the connectors C21 include a CAN connector terminal C211, a signal line connector terminal C212, a power connector terminal connected to the battery 50, and respective signal line connector terminals connected to the key switch 51, the maintenance switch 52 and the DIN-activation switch 54.

Further, while being connected to the connectors C21, the wire harness 8 is connected to, for instance, a communication controller, a vehicle-body controller, a monitor controller, the camera set, a radar set and a sensor set, which are not shown. Incidentally, the radar set includes, for instance, a wide-band radar and/or an ultrasonic sensor, which is provided to, for instance, the vehicle front portion of the dump truck 1 to detect an obstacle around the dump truck 1 as described later. The sensor set includes a variety of sensors such as a temperature sensor that detects the temperature of exhaust gas from an engine (not shown) and a temperature sensor that detects the temperature of cooling water for the engine. The communication controller transmits/receives information to/from an external communication device via a mobile phone or a satellite communication. The information includes, for instance, work-machine information such as position information and operation information on the dump truck 1. The position information can be acquired by receiving a GPS satellite signal with the GPS antenna 70 as described later.

The vehicle-body controller adjusts fuel injected to the engine from a fuel injector (not shown) to control the output of the engine. The monitor controller is connected to the monitoring display 6. The monitor controller controls the input/output of various types of information (e.g., information sent from the sensor set and information inputted using the monitoring display 6) and commands the monitoring display 6 to display the various types of information. The monitoring display 6, which includes a liquid crystal panel, can display, for instance, a driving speed, a fuel level, and warning information on device malfunction or the like.

The radar set detects a position of the dump truck 1 relative to an obstacle (not shown) around the dump truck 1. The radar set includes, for instance, eight radars that are arranged on an exterior of the vehicle body of the dump truck 1 (e.g., the front and rear and right and left of the vehicle body). The radars may be UWB (Ultra Wide Band) radars capable of detecting, for instance, an obstacle that is present a few meters away within a predetermined wide-angle range.

The sensor set includes a variety of sensors as described above. For instance, the sensor set includes sensors that detect an engine speed, the temperature of cooling water for the engine, an engine oil temperature, an exhaust gas temperature and the like. Incidentally, the controller 10 is also connected to the camera set and a surround-view monitor (not shown). The camera set is arranged on the exterior of the vehicle body of the dump truck 1 (e.g., the front and rear and right and left of the vehicle body) in the same manner as the radar set. The camera set includes, for instance, six cameras and has a predetermined field of view. The cameras may be CCD (Charge-Coupled Device) cameras.

The surround-view monitor displays the result of detection of an obstacle by the radar set and a bird's eye image obtained from an image captured by the camera set through image processing by the controller 10. Further, when the radar set detects an obstacle, the surround-view monitor gives an alarm by making a sound or displaying a caution sign.

The battery 50 (e.g., a DC (Direct Current) 24V storage battery) supplies electric power to electronic devices such as the controller 10, a head light (not shown) and the like. Incidentally, the battery 50 may always be connected to the controller 10 and the like or, alternatively, the supply of electric power from the battery 50 to the controller 10 and the like may be switched on and off by an on/off operation of a battery-disconnecting switch. The battery-disconnecting switch is a switch configured to cut off electric power supplied to all the devices that operate with the electric power from the battery 50.

The battery 50 is removable to be replaced. Accordingly, a battery monitor 50A is provided to monitor whether or not the battery 50 is installed/removed and output an activation signal A1 when the battery 50 is installed/removed. The battery monitor 50A is, for instance, an electric circuit configured to detect installation of the battery 50 in response to voltage detected on the circuit when the battery 50 is connected.

The key switch 51 is turned on using a key (not shown) and then electric power is supplied from the battery 50 to electric devices such as the controller 10, the head light (not shown) and the like. When the key is further turned to a position for starting the engine, a cell motor (not shown) is started and then the engine is started. When the key switch 51 is turned on, an activation signal A2 is outputted to the main board 20.

Next, description will be made on a maintenance switch 52. A serviceperson in charge of maintenance of the dump truck 1 connects a maintenance terminal to a service connector provided in the cab 3 in order to, for instance, acquire work-machine information gathered by the dump truck 1 or activate the controller 10. For instance, after the maintenance terminal, which is a dedicated terminal with toggle switches and the like, is connected to the service connector, the serviceperson turns on the maintenance switch 52 (i.e., one of the toggle switches). When the maintenance switch 52 is turned on, an activation signal A3 is outputted to the main board 20. Incidentally, the maintenance terminal may be replaced with a personal computer installed with a maintenance application program. In this case, the application program runs to generate the activation signal A3, which is outputted to the main board 20.

The real-time clock 25 (e.g., a clock IC) is a clock configured to constantly measure time. The real-time clock 25 has a timer function and outputs an activation signal A4 to an OR gate 23 and an inputted-trigger processor 213 of the main board 20 at a predetermined time as described later.

The DIN-activation switch 54 is provided in the connector box 55 and is turned on to use the maintenance terminal Specifically, when the DIN-activation switch 54 is turned on with the cover of the connector box 55 being opened and the maintenance terminal being connected to a connector terminal (not shown) through a cable, an activation signal A5 is outputted to the main board 20. Therefore, the serviceperson can, for instance, activate the controller 10 without entering the cab 3.

The battery monitor 50A, the key switch 51, the maintenance switch 52, the real-time clock 25 and the DIN-activation switch 54, which output the above activation signals A1 to A5, in combination serve as an internal-activation-signal sender. Further, a network controller 33 that outputs an activation signal A6 (described later) serves as an external-activation-signal sender.

The internal-activation-signal sender and the external-activation-signal sender in combination serve as an activation-signal sender. Incidentally, the above arrangement of the activation-signal sender including the internal-activation-signal sender and the external-activation-signal sender is merely an example and thus may include any other activation-signal sender.

Arrangement of Main Board

The main board 20 includes a main controller 21, an internal power supply 22, the OR gate 23 (i.e., a first activator), a power switch 24 that controls power supply to the PC board 30, and the real-time clock 25.

Arrangement of Main Controller

The main controller 21 includes a built-in work machine OS 211, an activation commander 212, the inputted-trigger processor 213, a monitor 214 and a memory 215.

The built-in work machine OS 211 is a built-in operating system with functions required to, for instance, controllably operate the work machine. The built-in work machine OS 211 is a built-in OS dedicated to work machines. When used for a work machine such as the dump truck, the built-in work machine OS 211 is designed to have a function required to, for instance, controllably tilt the vessel 5 provided to the dump truck. When the controller 10 is used for a hydraulic excavator, the built-in work machine OS 211 is designed to have a function required to controllably operate the working equipment.

The built-in work machine OS 211, which should be made by a developer of the work machine, has a high real-time property ensuring that a processing time falls within a predetermined range. Further, the built-in work machine OS 211 is compactly designed to run with a small amount of memory.

When the main controller 21 becomes active, the activation commander 212 outputs an activation-command signal B1 to the PC board 30 (i.e., the second board).

The inputted-trigger processor 213 is inputted with the activation signals A1 to A5 and the activation signal A6 for activating the controller 10. The activation signal A6 is outputted from the network controller 33 (described later). The inputted-trigger processor 213 outputs trigger information B2 about a trigger to the PC board 30.

Types of Triggers

As triggers to be inputted to the inputted-trigger processor 213, there are six types of events as follows according to the exemplary embodiment.

(1) Battery-Connection Activation

When it is detected that the battery 50 is installed/removed by monitoring whether or not the battery 50 is installed/removed, the monitor 50A outputs the activation signal A1. Incidentally, while the controller 10 can be in operation by an ACC power supply as long as the engine is running, the controller 10 is disabled with the battery 50 being removed when the engine is stopped. Accordingly, in order to keep the controller 10 in operation even when the battery 50 is removed, a UPS (Uninterruptible Power Supply) dedicated to the controller 10 needs to be provided. For instance, in order to obtain the activation signal A1 outputted in response to the installation of the battery 50, the above electric circuit capable of detecting the installation of the battery 50 may be used. The activation signal A1 can be obtained from the electric circuit.

Similarly, when the battery disconnecting switch capable of cutting off electric power supplied from the battery 50 is provided, the controller 10 is also disabled by operating the battery disconnecting switch to cut off the electric power supplied from the battery 50 while the work machine is not in operation. Accordingly, when the battery disconnecting switch is provided, the UPS for the controller 10 needs to be provided so that the controller 10 is reliably kept in operation even when the battery disconnecting switch is operated.

(2) Key-Switch Activation

When the key switch 51 is turned on, the key switch 51 outputs the activation signal A2.

(3) Maintenance-Switch Activation

When the maintenance switch 52 is turned on using the maintenance terminal or the like, the activation signal A3 is outputted.

(4) RTC (Real-Time Clock) Activation

The real-time clock 25 measures time and outputs the activation signal A4 at the predetermined time.

(5) DIN-Switch Activation

When the DIN-activation switch 54 is turned on, the activation signal A5 is outputted.

(6) WOL (Wake-on-LAN) Activation

When the specific signal for commanding the activation of the PC board 30 is inputted to the Ethernet network terminal C33 of the PC board 30 (described later) via a network, the activation signal A6 is outputted. The specific signal is also referred to as a magic packet.

Inputted-Trigger Processor

The inputted-trigger processor 213 determines which one of the activation signals A1 to A6 is inputted and outputs the trigger information B2 to a PC controller 31 (described later). According to the exemplary embodiment, since there are six triggers, the inputted-trigger processor 213 outputs the trigger information in the form of a 3-bit port signal to the PC controller 31.

Incidentally, when two or more of the activation signals A1 to A6 are inputted to the inputted-trigger processor 213 substantially at the same time, the trigger information B2 based on one of the activation signals A1 to A6 that was inputted first is outputted to the PC controller 31. Incidentally, when two or more of the activation signals are inputted first, the trigger with the highest priority according to a predetermined priority order is outputted to the PC controller 31.

The priority order of the triggers may be determined as desired. For instance, when the key-switch activation is defined as the highest-priority trigger, the key-switch activation is followed by the WOL activation, the RTC activation, the DIN-switch activation, the battery-connection activation and the maintenance-switch activation in this order. The priority order of the triggers may be determined in view of the execution frequencies of the triggers, the importance of processes following the triggers, and the like.

Monitor

The monitor 214 monitors the operating condition of the PC board 30. Specifically, the monitor 214 determines that the PC board 30 is in normal operation as long as a heart beat signal (i.e., a periodical response signal) is inputted from the PC board 30 to the main board 20 via ports provided to the connectors C22 and C31.

When the heart beat signal is not inputted, the monitor 214 determines that the PC board 30 has a malfunction and outputs a signal to a power supply 32 of the PC board 30 to reset and restart the PC controller 31. In this manner, when the PC board 30 is not in normal operation due to a problem of a software such as an application program, the PC board 30 can be automatically reset and restarted with the assistance of the monitor 214. Therefore, the PC controller 31 can be reliably activated and automatically recovered from an error.

Memory

The memory 215 is used as a data buffer or the like when the controller 10 is to be activated. When an operator of the dump truck 1 turns on the key switch 51 and electric power is supplied to the controller 10 from the battery 50, the main board 20, which has a high real-time property, immediately becomes active. In contrast, the PC board 30 is to be activated by an OS for PCs and thus needs time to become active. Accordingly, the memory 215 is used as a data buffer to temporarily store various types of data such as work-machine information inputted through the CAN and the signal lines before the PC board 30 becomes active. Incidentally, the PC board 30 itself may be provided with a memory to gather work-machine information after the PC board 30 becomes active.

When any one of the activation signals A1 to A6 is inputted to the inputted-trigger processor 213, the main controller 21 closes the power switch 24 so that electric power can be supplied to the PC board 30 from the battery 50.

The power supply 22 converts the voltage of the electricity supplied from the battery 50 into different voltages such as DC 5V, DC 3.3V and DC 1.2V. The voltages converted by the power supply 22 are supplied to the main controller 21 and the like.

The OR gate 23 is to be inputted with the activation signals A1 to A6 corresponding to the above six triggers. When at least one of the activation signals is inputted, the power supply 22 is turned on to activate the main controller 21. In other words, the OR gate 23 serves as the first activator that activates the main controller 21 in response to the input of the activation signals A1 to A6. Incidentally, as long as the first activator activates at least the main controller 21, the first activator may also activate other controllers and the like (if any) provided to the main board 20 as well as the main controller 21. In other words, the first activator may activate all the functions of the main board 20.

Arrangement of PC Board

The PC board 30 includes the PC controller 31, the internal power supply 32, and the network controller 33 connected to the network terminal C33 for Ethernet.

PC Controller

The PC controller 31 includes an OS 311 for PCs, a boot manager 312, an application manager 313, a maintenance manager 314 and trigger-associated applications 315.

The OS 311 for PCs is a high-spec OS used for PCs (Personal Computers). An example of the OS 311 for PCs is Windows (trademark). In this case, many developers can use this OS and thus adequate human resources can be ensured. Additionally, many existing applications are available. Further, the PC controller 31 can be added with a function requiring a large processing load only by adding a necessary application, if needed. An example of the function requiring a large processing load is a process for generating a bird-eye's image of the surroundings of the dump truck 1 based on an image captured by the camera set.

Boot Manager

The boot manager 312, which is an application that is initially activated by the OS 311 for PCs when the PC controller 31 becomes active, serves as a first determiner according to the exemplary embodiment.

The boot manager 312 thus determines whether or not the trigger indicated by the trigger information B2 outputted from the inputted-trigger processor 213 of the main board 20 is associated with a maintenance activation. One of the six triggers is preselected to be associated with the maintenance activation. The trigger preselected to be associated with the maintenance activation depends on a program in the boot manager 312. For instance, the activation signal A3 from the maintenance switch 52 is preselected to be associated with the maintenance activation while the other activation signals A1, A2 and A4 to A6 are triggers not associated with the maintenance activation. Alternatively, for instance, the activation signal A6 may be preselected to be associated with the maintenance activation while the other activation signals A1 to A5 are set as triggers not associated with the maintenance activation.

When the trigger is determined to be associated with the maintenance activation, the boot manager 312 activates the maintenance manager 314.

Application Manager

When the trigger is determined to be not associated with the maintenance activation, the boot manager 312 activates the application manager 313. In other words, the application manager 313 serves as a second determiner according to the exemplary embodiment. The boot manager 312 (the first determiner) and the application manager 313 (the second determiner) in combination serve as a trigger-identifying processor according to the exemplary embodiment.

The application manager 313 starts one of the trigger-associated applications 315 in accordance with the trigger information B2. In addition to starting the application, the application manager 313 also controls communication with the main board 20 (USB communication) and a later-described data transmission and reception via a wireless LAN or the like.

Maintenance Manager

When the trigger associated with the maintenance activation is preselected as described above, the maintenance manager 314 is activated in response to the trigger provided from the maintenance switch 52 to update programs and settings such as the application manager 313 and the trigger-associated applications 315. In other words, since an ongoing application cannot be updated due to the Windows specification, the maintenance manager 314 is provided independently of the application manager 313. When the trigger is determined to be associated with the maintenance activation, the boot manager (the first determiner) 312 activates not the application manager (the second determiner) 313 but the maintenance manager 314. In this manner, the maintenance manager 314 can update an inactive program in the application manager 313.

The maintenance manager 314 includes a program for updating programs such as the trigger-associated applications 315 as described above and thus executes a simple process. In other words, the maintenance manager 314 is constituted only by one or more programs essential for executing the simple process and thus does not require frequent program updates or the like. The maintenance manager 314 can be updated using a maintenance-manager-update function provided to the boot manager 312, if necessary. Incidentally, the PC board 30 itself may be replaced to update the boot manager 312.

As the trigger-associated applications 315, different applications depending on the triggers are prepared.

The power supply 32 converts the voltage of the electricity supplied from the battery 50 via the power switch 24 into different voltages such as DC 5V, DC 3.3V and DC 1.2V in the same manner as the power supply 22. The voltages converted by the power supply 32 are supplied to the PC controller 31 and the like.

When the activation-command signal B1 is inputted to the power supply 32 from the activation commander 212, the power supply 32 supplies the electricity with the converted voltages to the PC controller 31 to activate the PC controller 31. In other words, the power supply 32 serves as a second activator. Incidentally, as long as the second activator activates at least the PC controller 31, the second activator may also activate other controllers and the like (if any) provided to the PC board 30 as well as the PC controller 31. In other words, the second activator may activate all the functions of the PC board 30.

Network Controller

The network controller 33 controls data transmission and reception for external data communication through the network terminal C33. For instance, the network controller 33 is an IC including a CPU. The network terminal C33 is connected to a wireless LAN modem 60 through a cable and the antenna 61 is connected to the wireless LAN modem 60.

The network controller 33 transmits data outputted from the PC controller 31 to the outside of the dump truck 1 via the network terminal C33, the wireless LAN modem 60 and the antenna 61.

The network controller 33 also transmits data received from the outside of the dump truck 1 to the PC controller 31 via the antenna 61, the wireless LAN modem 60 and the network terminal C33. Incidentally, upon reception of the above magic packet (specific signal), the network controller 33 outputs the activation signal A6 to the main board 20 without directly activating the PC controller 31.

In other words, the network terminal C33, the wireless LAN modem 60 and the antenna 61 in combination serve as a communication unit for communication with the outside of the work machine. When the specific signal for commanding the activation of the information processor is externally inputted to the communication unit, the network controller 33 outputs the activation signal A6 to the main board (the first board) 20. In other words, the network controller 33 serves as the external-activation-signal sender.

Incidentally, since the network controller 33 is required to work in response to the specific signal even when the controller 10 is not in operation, the network controller 33 is connected to a power supply line (not shown) extending from the battery 50 via the main board 20 and the power supply 32. Therefore, even when the dump truck 1 is not in operation (i.e., the engine of the dump truck 1 is stopped), the network controller 33 is constantly supplied with electric power from the battery 50.

The extension-function-processing board 40 as shown in FIG. 3, which is not explained in detail, processes, for instance, an image captured by the camera set and serves as a board dedicated to assisting an image processing. The extension-function-processing board 40 executes a process for generating bird's eye image data of the surroundings of the dump truck 1 based on the image captured by the camera set as described above, and transmits the bird's eye image data to the PC board 30. The PC board 30 outputs the received bird's eye image data to the monitoring display 6.

Activation Control

Figure 5:
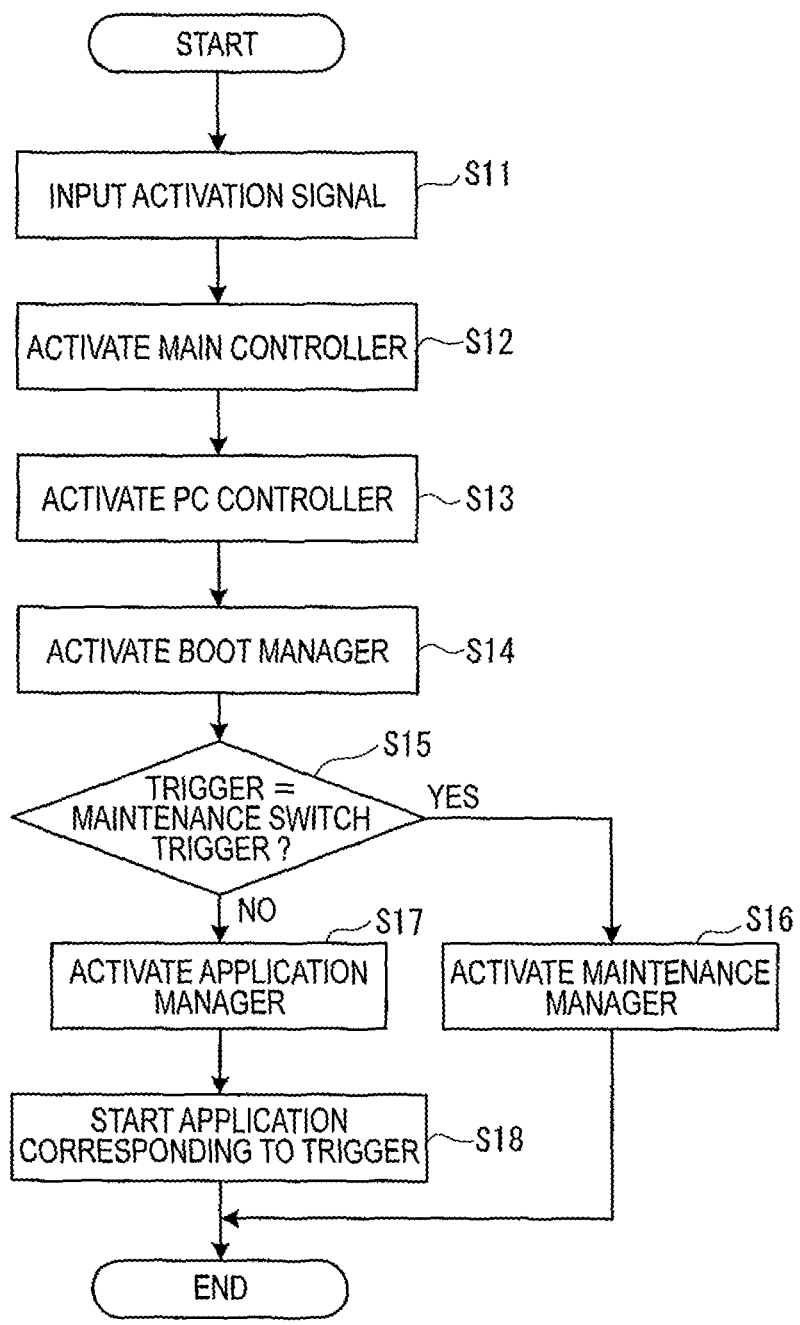
FIG. 5 is a flow chart showing an activation process for the controller.

Next, an activation control of the controller 10 will be described with reference to a flow chart of FIG. 5. FIG. 5 shows the activation control performed when the controller 10 receives any one of the activation signals A1 to A6 corresponding the above six triggers.

In response to occurrence of any one of the above triggers, the corresponding one of the activation signals A1 to A6 is inputted to the main board 20 (step S11). Specifically, when the specific signal (e.g., the magic packet) is inputted to the network terminal C33 from an external terminal through the wireless LAN, the network controller 33 (i.e., the external-activation-signal sender) generates the activation signal A6, which is inputted to the main board 20. Similarly, when any one of the switches such as the key switch 51, the maintenance switch 52 and DIN-activation switch 54 (i.e., the internal-activation-signal sender) is turned on, the corresponding one of the activation signals A2, A3 and A5 is generated and inputted to the main board 20. When the monitor 50A (i.e., the internal-activation-signal sender) detects the removal of the battery 50 or when the real-time clock 25 reads the predetermined time, the activation signal A1 or A4 is generated and inputted to the main board 20.

Subsequently, the OR gate 23 of the main board 20 controls the power supply 22 to start the built-in work machine OS 211 and activate the main controller 21 (step S12).

When the main controller 21 becomes active, the power switch 24 is closed and the activation commander 212 outputs the activation-command signal B1 to the power supply 32 of the PC board 30. Further, the OS 311 for general PCs is started to activate the PC controller 31 (step S13).

In the activation of the PC controller 31, the boot manager 312 is initially activated (step S14).

Based on the trigger information B2 inputted from the inputted-trigger processor 213, the boot manager 312 determines whether or not the trigger is associated with the maintenance activation (i.e., whether or not the trigger is provided from, for instance, the maintenance switch 52) (step S15).

When the determination result is Yes in step S15, the boot manager 312 activates the maintenance manager 314 (step S16). The maintenance manager 314, for instance, updates the application manager 313 and the trigger-associated applications 315 and/or changes the various settings.

When the determination result is No in step S15, the boot manager 312 activates the application manager 313 (step S17).

The application manager 313 identifies the trigger based on the trigger information B2 and starts the corresponding one of the trigger-associated applications 315 (step S18). Applications prepared and installed as the trigger-associated applications 315 may be different depending on the triggers and suitable for the type of the work machine or the like.

For instance, when the trigger is the installation/removal of the battery 50, the activation signal A1 is generated as described above and the application manager 313 starts a vehicle-malfunction-monitoring application. The vehicle-malfunction-monitoring application is configured to monitor whether or not the work machine has a malfunction using a camera or a sensor and/or to identify an operator who installed the battery 50.

When the trigger is the on-operation of the key switch 51, the activation signal A2 is generated as described above and the application manager 313 starts an operator-work-supervising application. The operator-work-supervising application is configured to obtain work information on an operator for the purpose of supervision. For instance, according to the operator-work-supervising application, every time when the key switch 51 is operated, a photograph of an operator is taken with a camera provided in the cab 3 to identify the operator.

When the trigger is related to the real-time clock 25, the activation signal A4 is generated as described above and the application manager 313 starts a work-information-downloading application. The work-information-downloading application is configured, for instance, to read out the work-machine information on the dump truck 1 from the memory 215 and transmit the work-machine information to a management server, which controls the work machine, via communication equipment such as the wireless LAN of the communication unit.

When the trigger is related to the DIN-activation switch 54, the activation signal A5 is generated as described above and the application manager 313 starts an application in accordance with instructions from a terminal connected to the connector box 55.

In the WOL activation, the activation signal A6 is generated as described above and the application manager 313 starts the work-information-downloading application. The work-information-downloading application may automatically perform a process for, for instance, reading out the work-machine information from the memory 215 and transmitting the work-machine information to the management server via communication equipment such as the wireless LAN of the communication unit. Alternatively, the work-information-downloading application may perform a process in accordance with instructions from an external PC that commanded the WOL activation.

For instance, the work-information-downloading application activates a surrounding-monitoring system including the camera set provided to the dump truck 1 and transmits an image captured by the cameras to an external administrator's terminal. As a result, for instance, the administrator of the dump truck 1 can remotely check the surroundings of the dump truck 1.

When the controller 10 can be activated by WOL (i.e., the WOL activation), the following options are available.

For instance, the maintenance manager 314 of the PC controller 31 may be activated by WOL to remotely update the programs of the trigger-associated applications 315 and/or change the settings of the trigger-associated applications 315.

For instance, in order to remotely acquire position information received by the GPS antenna 70, the trigger-associated applications 315 may be added with an application capable of transmitting the current position of the dump truck 1 to the outside of the dump truck 1 when the dump truck 1 is not in operation, which contributes to antitheft measures.

For instance, the trigger-associated applications 315 may be added with an application capable of remotely turning on an air conditioner in the cab 3 to adjust the temperature in the cab 3 before an operator starts operating the dump truck 1.

Additionally, the trigger-associated applications 315 may include an application configured to download the work-machine information and the like acquired by storages such as the memory 215 when the controller 10 is activated by WOL, thereby remotely reading out the work-machine information and the like when the dump truck 1 is not in operation.

As described above, the PC controller 31 of the PC board 30 can automatically start the appropriate one of the applications in accordance with the triggers. In particular, since the PC controller 31 runs on the OS for PCs, applications with a variety of functions can be easily developed. Therefore, various types of control suitable for the work machine can be performed by automatically starting applications with various functions in accordance with the triggers.

Incidentally, when the magic packet (i.e., the specific signal) is transmitted to a work machine such as the dump truck 1 to activate the controller 10 (i.e., the WOL activation), the magic packet should include identification information, such as a MAC address (Media Access Control address), for identifying the work machine. In this manner, when the work machine corresponding to the identification information such as a MAC address receives the magic packet, the controller 10 in the work machine is activated by WOL.

The controller 10 according to the exemplary embodiment can be accessed by a terminal connectable through a wireless LAN. Therefore, when a work machine is provided with the controller 10 according to the exemplary embodiment, a serviceperson or the like can activate the controller 10 without going to a site where the work machine is operated as long as a terminal capable of transmitting the magic packet is present within an area where wireless communication through communication equipment such as a wireless LAN provided to the work machine is available.

For instance, an access point for a wireless LAN may be provided only at a predetermined place such as a gas station in a mine or the like. In this case, as long as a work machine such as the dump truck 1 is not in operation at the gas station, the controller 10 can be remotely activated by WOL via the access point. On the other hand, when a work machine such as the dump truck 1 is present at a place remote from an access point for a wireless LAN, the controller 10 cannot be remotely activated by WOL via the access point. In this case, when a serviceperson or the like comes sufficiently close to the work machine along with a terminal connectable through a wireless LAN, the controller 10 can be activated by WOL in response to the magic packet transmitted from the terminal to the work machine.

When the specific signal for the WOL activation is inputted to the network terminal C33 of the PC board 30, the main controller 21 of the main board 20, not the PC controller 31, is initially activated and then the PC board 30 is activated by the main board 20. Therefore, the PC board 30 can be controlled as a guest system of the main board 20, so that when the specific signal for the WOL activation is inputted, the PC board 30 can be property activated under the supervision of the operation of the PC board 30 by the main board 20. As a result, one of the trigger-associated applications 315 corresponding to the WOL activation using the specific signal can be reliably executed. In this manner, the controller (information processor) 10 can be remotely activated to execute processes such as updating/setting a program and downloading operation data to the management server. Therefore, even when a work machine such as the dump truck 1 works in a mine or the like, the maintenance of the work machine can be easily performed with a less load on a serviceperson.

The main board 20 is provided with the memory 215, so that work-machine information and the like acquired before the PC board 30 becomes active can be temporarily stored in the memory 215 and the work-machine information and the like can be transferred to the PC board 30 after the PC board 30 becomes active. Therefore, the PC controller 31 can perform a process even on operation data inputted before the PC controller 31 becomes active, and thus the work-machine information and the like can be prevented from missing while the controller 10 is being activated.

Modification(s)

It should be appreciated that the scope of the invention is not limited to the above exemplary embodiment but modifications and improvements that are compatible with an object of the invention are included within the scope of the invention.

For instance, the above triggers according to the exemplary embodiment are not exhaustive. Further, the triggers other than the WOL activation and the key-switch activation are not requisite.

The extension-function-processing board 40 provided according to the exemplary embodiment may be omitted. The radar set and the camera set may be provided as needed.

The work machine may be a hydraulic excavator, a bulldozer, a wheel loader or the like instead of the dump truck.

The invention claimed is:

1. An information processor for a work machine, the information processor comprising:
    a first board; and
    a second board,
    the first board comprising:
    a main controller being configured to run on a built-in work machine operating system;
    a first activator being configured to activate the main controller when an activation signal for activating the information processor is inputted; and
    an activation commander being configured to output an activation-command signal to the second board,
    the second board comprising:
    a PC controller being configured to run on an operating system for personal computers;

a communication unit being configured to communicate with an outside of the work machine;

an external-activation-signal sender being configured to output the activation signal to the first board when a specific signal for commanding activation of the information processor is inputted to the communication unit from an outside of the work machine; and a second activator being configured to activate the PC controller when the activation-command signal outputted from the activation commander is inputted.

2. The information processor for the work machine according to claim 1, further comprising an activation-signal sender being configured to output the activation signal to the first board, the activation-signal sender being provided to the work machine, wherein the activation-signal sender comprises the external-activation-signal sender and an internal-activation-signal sender that is configured to output the activation signal in response to occurrence of an event different from an event for the external-activation-signal sender, the first board further comprises an inputted-trigger processor being configured to output trigger information to the second board, the trigger information indicating a type of a trigger corresponding to the activation signal outputted from the activation-signal sender, and the second board further comprises a trigger-identifying processor being configured to identify the trigger based on the trigger information outputted from the inputted-trigger processor and to start an application corresponding to the identified trigger.

3. The information processor for the work machine according to claim 2, wherein the trigger-identifying processor comprises:

a first determiner being configured to determine whether or not the trigger is associated with a maintenance activation and to activate a maintenance manager to perform an maintenance of the PC controller when the trigger is determined to be associated with the maintenance activation; and a second determiner being configured to be activated, when the first determiner determines that the trigger is not associated with the maintenance activation, to start an application corresponding to the type of the trigger determined to be different.

4. The information processor for the work machine according to claim 1, wherein the first board further comprises a monitor being configured to monitor whether or not the PC controller is in a normal operation.

5. The information processor for the work machine according to claim 1, wherein the first board further comprises a memory, and the main controller temporarily stores in the memory operation data on the work machine inputted to the first board when the PC controller is being activated and transfers the operation data temporarily stored in the memory to the second board after the PC controller becomes active.

6. A work machine comprising the information processor for the work machine according to claim 1.

7. An information processor for a work machine, the information processor comprising:

a first board comprising a main controller being configured to run on a built-in work machine operating system;

a second board comprising a PC controller being configured to run on an operating system for personal computers; and an activation-signal sender being configured to output an activation signal to the first board, the activation-signal sender being provided to the work machine, the first board further comprising:

a first activator being configured to activate the main controller when the activation signal for activating the information processor is inputted;

an activation commander being configured to output an activation-command signal to the second board;

an inputted-trigger processor being configured to output trigger information to the second board, the trigger information indicating a type of a trigger corresponding to the activation signal outputted from the activation-signal sender; and a monitor being configured to monitor whether or not the PC controller is in a normal operation, the second board further comprising:

a communication unit being configured to communicate with an outside of the work machine;

an external-activation-signal sender being configured to output the activation signal to the first board when a specific signal for commanding activation of the information processor is inputted to the communication unit from an outside of the work machine;

a second activator being configured to activate the PC controller when the activation-command signal outputted from the activation commander is inputted; and a trigger-identifying processor being configured to identify the trigger based on the trigger information outputted from the inputted-trigger processor and to start an application corresponding to the identified trigger, wherein the activation-signal sender comprises the external-activation-signal sender and an internal-activation-signal sender that is configured to output the activation signal in response to occurrence of an event different from an event for the external-activation-signal sender.

8. A work machine comprising the information processor for the work machine according to claim 7.

9. An information processing method for a work machine, the work machine comprising an information processor, the information processor comprising: a first board comprising a main controller being configured to run on a built-in work machine operating system; and a second board comprising: a PC controller being configured to run on an operating system for personal computers; a communication unit being configured to communicate with an outside of the work machine; and an external-activation-signal sender being configured to output an activation signal to the first board when a specific signal for commanding activation of the information processor is inputted to the communication unit from an outside of the work machine, the method comprising:

inputting the specific signal for commanding the activation of the information processor to the communication unit;

outputting the activation signal to the first board from the external-activation-signal sender in response to the specific signal;

activating the main controller in response to the activation signal;

outputting an activation-command signal to the second board from the main controller; and activating the PC controller when the activation-command signal is inputted.

* * * * *